No. 821,741. PATENTED MAY 29, 1906.
M. I. PUPIN.
TELEGRAPHY.
APPLICATION FILED JAN. 28, 1895.
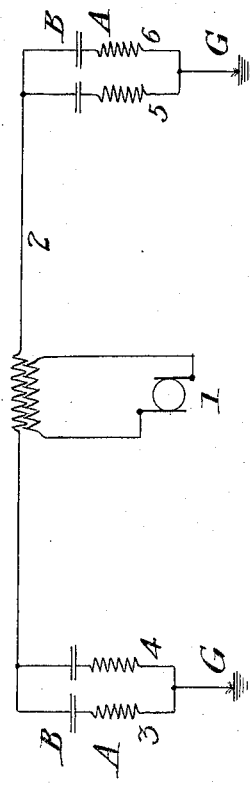
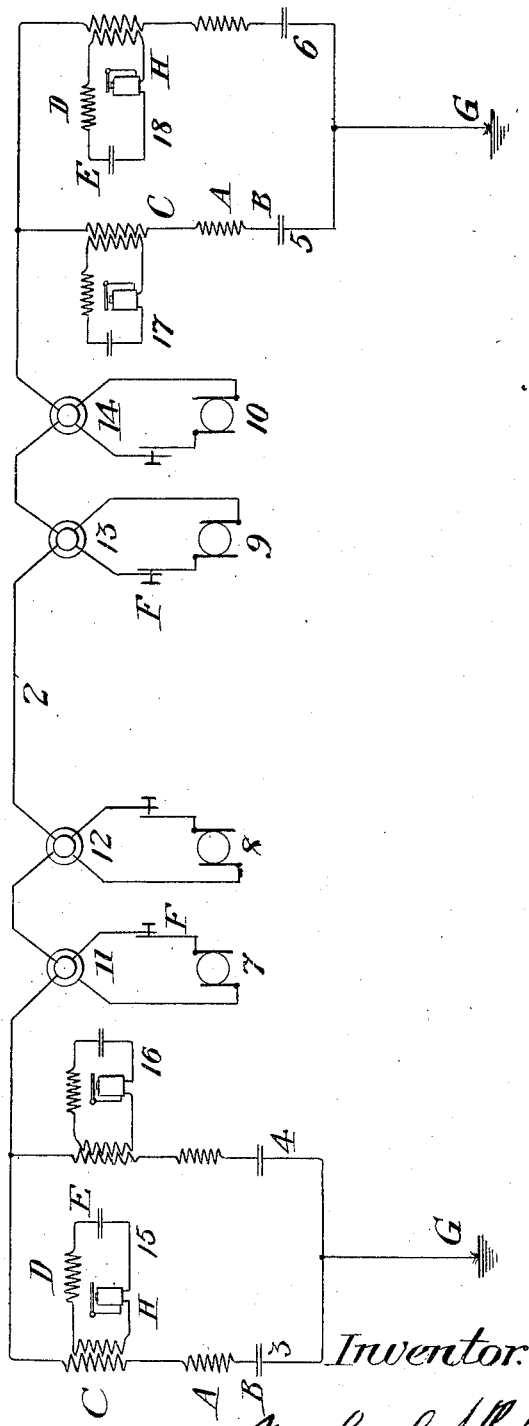
Witnesses
Thomas Ewing, Jr.
Samuel W. Balch
Inventor.
Michael I. Pupin

UNITED STATES PATENT OFFICE.

MICHAEL I. PUPIN, OF NEW YORK, N. Y.

TELEGRAPHY.

No. 821,741.   Specification of Letters Patent.   Patented May 29, 1906.

Application filed January 28, 1895. Serial No. 536,488.

*To all whom it may concern:*

Be it known that I, MICHAEL I. PUPIN, of the city, county, and State of New York, have invented a new and useful Improvement in Telegraphy, of which the following is a specification.

The physical fact upon which my invention is based is as follows: When a certain number of simple harmonic electromotive forces are impressed upon a line conductor, then a branch line may be adjusted so that it will offer a very much smaller impedance to one of these electromotive forces than to the others. This will take place when the natural period of this branch is the same as that of the selected electromotive force. This physical fact is known under the name of "electrical resonance." To produce electrical resonance between a circuit and an impressed electromotive force, the electromagnetic constants of the line—that is, its self-induction and electrostatic capacity—must be adjusted according to well-known rules. A resonating line is selective. The possibility of attaching to a main line a certain number of selective branches enables the foregoing principle to be applied to multiplex telegraphy. In practice, however, certain serious difficulties appear. These are, first, that the selective power of an electrically-tuned branch circuit forming part of a system diminishes materially with the increase in the number of branches from the main conductor, and, second, that when there are several complex harmonic electromotive forces impressed upon the system the upper harmonics of one may come within the frequencies of the fundamentals of the others, especially if more than three or four frequencies be employed, with consequent confusion.

I have here shown my present invention embodied in a system of multiplex telegraphy; but it is to be understood that it may be practically employed in various ways and by other forms of apparatus than are here set forth, and that hence I do not limit myself to its specific application to multiplex telegraphy.

My invention consists, first, in the method of and apparatus for throwing upon a main line a number of alternating currents of different frequencies independently of each other and distributing the energy of these several currents each selectively to a separate electrical translating device; second, in an electrical system wherein one or more induced circuits may be tuned in electrical resonance respectively with the impressed electromotive forces of different periodicities and this independently of one another and of all the rest of the system to which they belong; third, in the method and apparatus for converting a complex harmonic electromotive force impressed upon an electrical system into a simple harmonic electromotive force; fourth, in the construction and arrangement of the multiplex telegraph, hereinafter described.

The accompanying drawings are an electrical diagram.

Figure 1 illustrates a multiplex telegraph-line not provided with the tuned induced circuits hereinafter described. Fig. 2 illustrates a multiplex telegraph-line embodying my present invention.

Similar characters of reference indicate like parts.

In Fig. 1, let 1 be a generator impressing, as indicated, by induction upon the main line 2 four simple harmonic electromotive forces of different frequencies. 3, 4, 5, and 6 are branches connected to line on one side and to ground G on the other. In each branch is a self-induction coil A and a capacity B. By properly adjusting the self-induction A and the capacity B in each branch they can be made selective with respect to the four impressed electromotive forces; but it will be found that their selective power, even under most favorable conditions, will be too small for practical purposes, especially when the static capacity and the self-induction of the line 2 itself are considerable—as, for instance, in the case of long telegraph-lines. This is evident from purely theoretical reasons alone, while experimental investigations have convinced me that it is practically impossible to obtain a satisfactory balance in a system of this description, since the variation in the electrical constants in any one of the branches or in the main line will effect seriously the resonance balance in every other branch. By making, however, each of the self-inductions A of the several branches very large in comparison with the self-induction of the line tolerably satisfactory results can be obtained. This remedy of the difficulty is evidently not applicable in the case of long telegraph-lines, since in these the self-induction and static capacity are too large. In such event the best that can be done is to establish by adjustments as described an approximate resonance in the various branches.

Referring now to Fig. 2, 7, 8, 9, and 10 are alternating-current generators giving four electromotive forces of four different frequencies. These generators are connected to the primary circuits of four transformers 11 12 13 14, independently of each other and simultaneously or otherwise. The secondary circuits of these transformers form part of the main line 2. The cores of the transformers are of finely-laminated iron and form closed or very nearly closed magnetic circuits. I wish to emphasize this fact because it is one of the important features of my invention. Connected to the main line 2 and to the ground G are four branches 3 4 5 6. Each one of these branches, as 3, has a primary coil C and another coil or coils A. The coil C, I shall call the active coil, and the coil A the auxiliary coil. Also in each branch is a condenser or condensers B. The number of auxiliary coils and condensers in each branch may be any number, all of them connected in series. Each branch is placed by means of the active coil in inductive relation to a secondary circuit. Thus, for instance, the branch 3 is in inductive relation to the circuit 15, which includes a coil D of large and adjustable self-induction, a condenser E of suitable capacity for telegraphic purposes, and any suitable apparatus H which serves to indicate a current in this circuit by means of an electromagnetic, electrochemical, or electrostatic effect. Four keys F serve the purpose of making and breaking or simply varying the strength of the generator-current. The four generators 7 8 9 10, with the transformers 11 12 13 14 and the keys F, constitute the outfit for the four sending-stations. The four branches 3 4 5 6, with their four secondary circuits, constitute four distinct receiving-stations.

The method of operating is as follows: Let the frequencies of the generators at the sending-stations be, respectively, six hundred, five hundred and twenty, four hundred and forty, and three hundred and sixty periods per second. The branches 3 4 5 6 being at the receiving-stations are adjusted by means of the condensers B and the auxiliary coils A, so as to be approximately in resonance with the frequencies aforesaid, respectively. These branches are adjustable independently of each other. The secondary circuits 15 16 17 18 in each receiving-station are put in perfect resonance with these frequencies, but in such a way that the resonance balance of any one of these branches is entirely independent of the physical constants of the branches themselves or the line or any of the other secondary circuits and depends solely upon the self-induction and the capacity of that secondary circuit alone. This I accomplish by making the auxiliary adjustable coils D of so large a self-induction that the self-induction of each secondary circuit is practically equal to the self-induction of its auxiliary coil. The capacities are then adjusted according to the well-known rules in order to produce resonance with the frequency at which each receiving-station is intended to work. By keeping down the resistance of the secondary circuits and by avoiding the use of iron in the auxiliary coils of these circuits they can be made easily to respond a thousand times more strongly to the frequency to which they are tuned than to any other frequency, and this independently of whatever variations in the electrical constants may be going on in the other parts of the system. Supposing now that the four generators at the sending-stations impress simple harmonic forces upon the line and that the primary circuits are closed, there will be electromotive forces of the above frequencies impressed on the line, and hence alternating currents of like frequencies, respectively, on the secondary circuits at the receiving-stations. If the primary current from, say, generator 7, is interrupted, then the current in the corresponding branch—say 3—will also be interrupted, whereas the currents in the other branches at the other receiving-stations will not be affected. Hence if an operator works a key, as F, the sounder H in the secondary circuit 15 will be operated, but not the sounders in any of the other secondary circuits.

It is evident that any number of transmitting and receiving stations can be working simultaneously on the same line without disturbing each other. The limit to this number will be determined by the limiting frequencies at which the lines can work. On a line, say, five hundred miles long, the highest frequency will probably be six hundred periods per second and the lowest forty. Any frequency employed should be at least fifteen per cent. of its own value distant from the next higher and the next lower frequency, so that a line five hundred miles long could be worked conveniently at from twelve to sixteen different frequencies, and therefore have twelve to sixteen transmitting and receiving stations. This is, however, on the supposition that each transmitting-station sends a simple harmonic electromotive force or current. It is, however, practically impossible to produce alternating-current generators capable of giving such a force. As a rule they give alternating electromotive forces in which the upper harmonics, especially the third and the fifth, are of nearly the same order of magnitude as the fundamental. Hence although the fundamental frequency of any one of the sending-stations does not come within the proximity of the frequency of any other station the harmonic will, especially when the line is worked at more than three or four frequencies.

My investigations show that transformation by means of a transformer whose iron core forms an ordinary closed magnetic circuit when worked at saturation of between one thousand and fifteen thousand centimeter gram second lines of force per square centimeter will give in the secondary circuit a simple harmonic electromotive force whose frequency is equal to the fundamental frequency of the impressed electromotive force, no matter how complex the impressed electromotive force may be. This is especially true if the fundamental frequency is not below thirty-five periods per second, and if magnetic leakage is encouraged by arranging the primary and the secondary circuit in such a way as that they do not overlap, somewhat in the fashion of constant-current transformers employed for alternating-current arc lighting. It is such transformers that I prefer to employ in my present system of multiplex telegraphy.

It will be seen in each of the forms shown that I have a system of interrelated conductors, including parts, whether they be branches or separate circuits, containing self-induction coils and condensers by which these parts can be made selective each to a desired frequency. The selectivity of the system lies in these selective parts.

I claim—

1. In an electrical system the combination of a main line, means for throwing several electromotive forces of different frequencies onto the main line through transformers having cores which form closed magnetic circuits and having large magnetic leakage, selective parts connected to the main line, and means for tuning each selective part to respond to one of the electromotive forces thrown upon the main line, substantially as described.

2. The combination in a telegraphic system containing two or more circuits of means for imposing upon said system electromotive forces of predetermined periodicities, means for electrically tuning each of said circuits to an approximate resonance with one of said electromotive forces, by properly proportioning its electromagnetic constants with respect to the system, a circuit in inductive relation with each of said tuned circuits tuned to a complete resonance with one of said periodic electromotive forces and independently of the rest of the system, substantially as described.

3. The combination in a telegraphic system of two or more circuits and a means of imposing upon said system an electromotive force of previously-selected periodicity and in one of said circuits means for electrically tuning it to approximate resonance with said electromotive force (by properly proportioning its electrical constants with respect to the rest of the system) a circuit in inductive relation to said tuned circuit including a self-induction coil and a capacity; the said coil being so proportioned as to produce in the circuit, a self-induction very large as compared with the whole self-induction of the circuit; whereby said secondary circuit may be electrically tuned in resonance with said periodic electromotive force and independently of the rest of the system.

4. The combination in a telegraphic system of a line conductor, two branch circuits each including a primary coil, a self-induction coil and a capacity, two secondary circuits containing a secondary coil (in inductive proximity to one of said primary coils) a self-induction coil, and a capacity and a telegraphic receiving apparatus, means of imposing two periodic electromotive forces upon said line, and telegraphic transmitting apparatus arranged to vary said electromotive forces: the said parts being constructed and combined so that each branch circuit is tuned in approximate electrical resonance, and the induced secondary circuit thereof in electrical resonance with one of said imposed electromotive forces.

5. In an electrical system the combination of a common conductor, means for throwing several electromotive forces at different frequencies onto the common conductor through transformers having cores which form closed magnetic circuits and having large magnetic leakage, selective parts receiving energy from the common conductor, and means for tuning each selective part to respond to one of the electromotive forces thrown upon the common conductor, substantially as described.

6. The combination in a telegraphic system of a common conductor, two branch circuits each including a primary coil, a self-induction coil and a capacity, two secondary circuits containing a secondary coil (in inductive proximity to one of said primary coils) a self-induction coil, and a capacity and a telegraphic receiving apparatus, means of imposing two periodic electromotive forces upon said conductor, and telegraphic transmitting apparatus arranged to vary said electromotive forces; the said parts being constructed and combined so that each branch circuit is tuned in approximate electrical resonance, and the induced secondary circuits thereof in electrical resonance with one of said imposed electromotive forces.

MICHAEL I. PUPIN.

Witnesses:
 THOMAS EWING, Jr.,
 SAMUEL W. BALCH.